United States Patent
Jacobs

[15] 3,697,704
[45] Oct. 10, 1972

[54] CIRCUITS FOR PRIVATE AUTOMATIC TELEPHONE EXCHANGE SYSTEMS

[72] Inventor: Michael Lawrence Jacobs, Earls Barton, England

[73] Assignee: The General Electric Company Limited, London, England

[22] Filed: Oct. 1, 1970

[21] Appl. No.: 77,096

[30] Foreign Application Priority Data

Oct. 2, 1969 Great Britain..........48,561/69

[52] U.S. Cl...............................179/86, 197/16 AA
[51] Int. Cl.............................................H04q 1/38
[58] Field of Search...179/16 A, 16 AA, 86; 340/352

[56] References Cited

UNITED STATES PATENTS

| | | | |
|---|---|---|---|
| 3,319,010 | 5/1967 | Franchi et al. | 179/86 X |
| 3,243,516 | 3/1966 | Herter | 179/86 |
| 3,330,914 | 7/1967 | Herter | 179/86 |
| 3,487,171 | 12/1969 | Schuberth | 179/86 X |

FOREIGN PATENTS OR APPLICATIONS

| | | | |
|---|---|---|---|
| 1,487,832 | 2/1969 | Germany | 179/86 |

*Primary Examiner*—William C. Cooper
*Attorney*—Kirschstein, Kirschstein, Ottinger & Frank

[57] ABSTRACT

A detector circuit for use in a private exchange using pushbutton controlled "leg-signalling," the circuit comprising four transistors different ones or combinations of which become conducting in response to currents resulting from the application of an alternating voltage to different combinations of terminations applied to the line wires by operation of respective pushbuttons at the extension. The combinations of terminations serve to indicate the digit values of the respective pushbuttons for the purpose of signalling to the exchange equipment the number of an extension to be called.

9 Claims, 7 Drawing Figures

Figure 1:
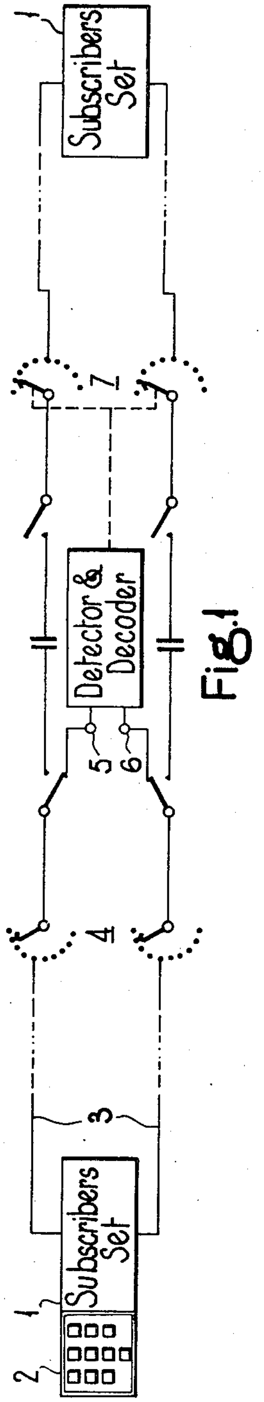

INVENTOR
MICHAEL LAWRENCE JACOBS
BY
Finnegan, Henderson, Olga & Frank
ATTORNEYS

INVENTOR
MICHAEL LAWRENCE JACOBS
BY
Kurlander, Kurlander, Offner & Frank
ATTORNEYS INVENTOR
Michael Lawrence-Jacobs
By Kurtz, Kurtz, Olga & Frank
ATTORNEYS INVENTOR
MICHAEL LAWRENCE JACOBS
BY
Kurtz, Kurtz, [signature]
ATTORNEYS INVENTOR
MICHAEL LAWRENCE JACOBS
BY [signature]
ATTORNEYS

CIRCUITS FOR PRIVATE AUTOMATIC TELEPHONE EXCHANGE SYSTEMS

The present invention relates to circuits for private automatic telephone exchange systems.

In particular the invention is concerned with detector circuits for private telephone exchange systems using pushbutton controlled leg-signalling, in which the digit valves of a called subscriber's extension number are signalled to the exchange from a calling subscriber's instrument by the application of respective combinations of a plurality of predetermined terminations, under the control of respective push buttons at that calling subscriber's instrument, to the ends of the two line wires connecting that instrument to the exchange.

According to the present invention in a private automatic telephone exchange system in which subscriber-operated pushbuttons are used to apply respective combinations of a plurality of different terminations to the two line wires of the respective subscriber's line to signal to the exchange the digits of a number to be called, there is provided at the exchange a detector circuit comprising two groups of transistors, means to apply an alternating voltage to each of said line wires by way of an input circuit of each transistor of a respective one of said groups, whereby different current flow conditions are developed in said input circuits in response to the application of different terminations to said line wires, and different ones or combinations of the transistors of a group are caused to conduct in response to the application of said different terminations, and there are provided means responsive to current flow through said transistors to register the value of a digit being signalled.

Preferably there are four different terminations for each of the line wires comprising respectively open circuit, a direct connection to earth and connections to earth by way of rectifier elements poled respectively in opposite senses, and each group of transistors comprises two transistors of opposite conductivity type. The alternating voltage may be applied in common to the emitter electrodes of all four transistors while the base electrodes of the two transistors of each group are connected to the respective line wire. Each of the four transistors may be arranged when conducting to energize a respective relay either directly or by way of a respective transistor buffer stage, and there may be provided marking means operable in response to the energization of different combinations of said relays to apply marking potentials to different contacts of a final selector. The marking means may comprise a plurality of further relays.

Figure 7:
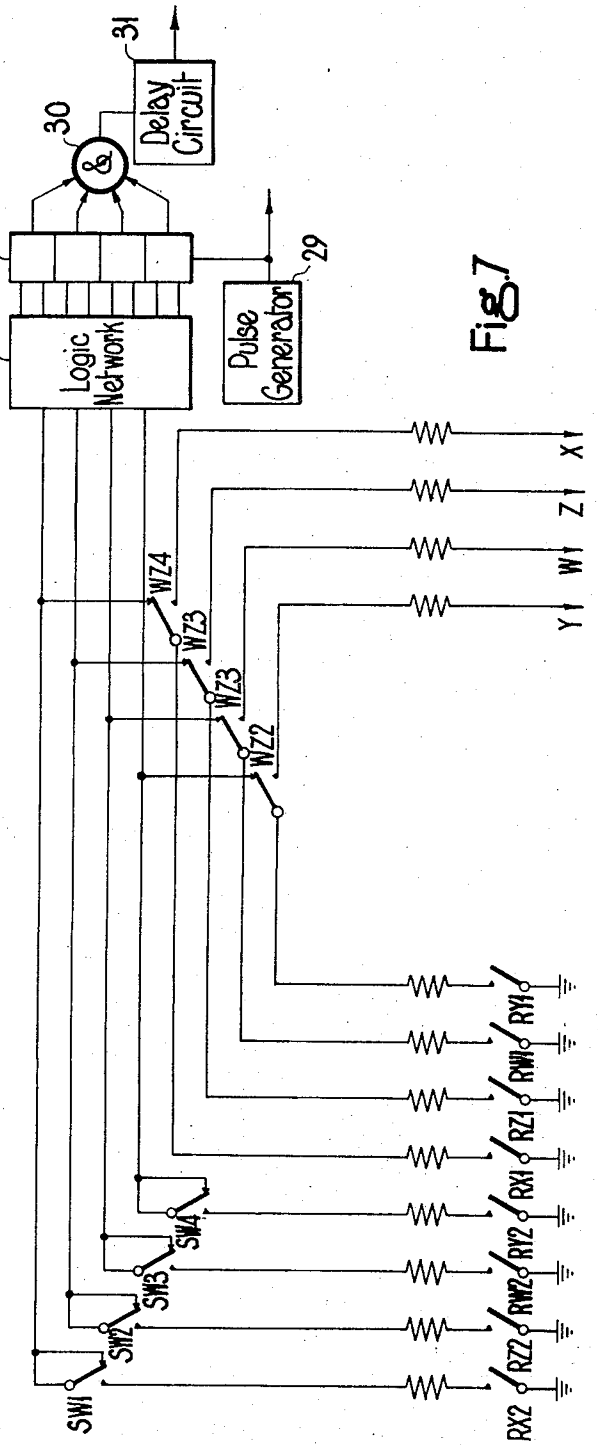
Figure 2:
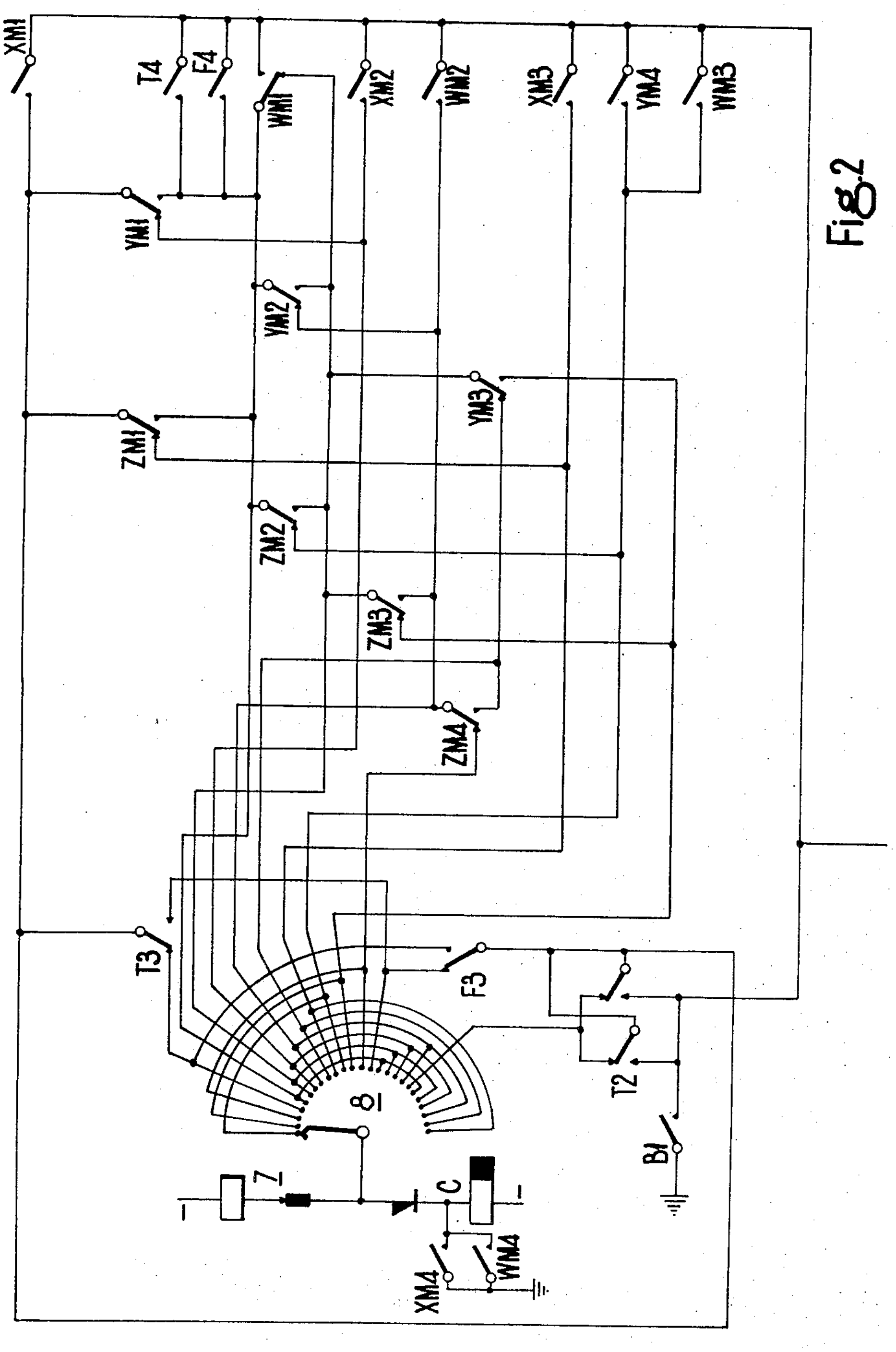
Figure 3:
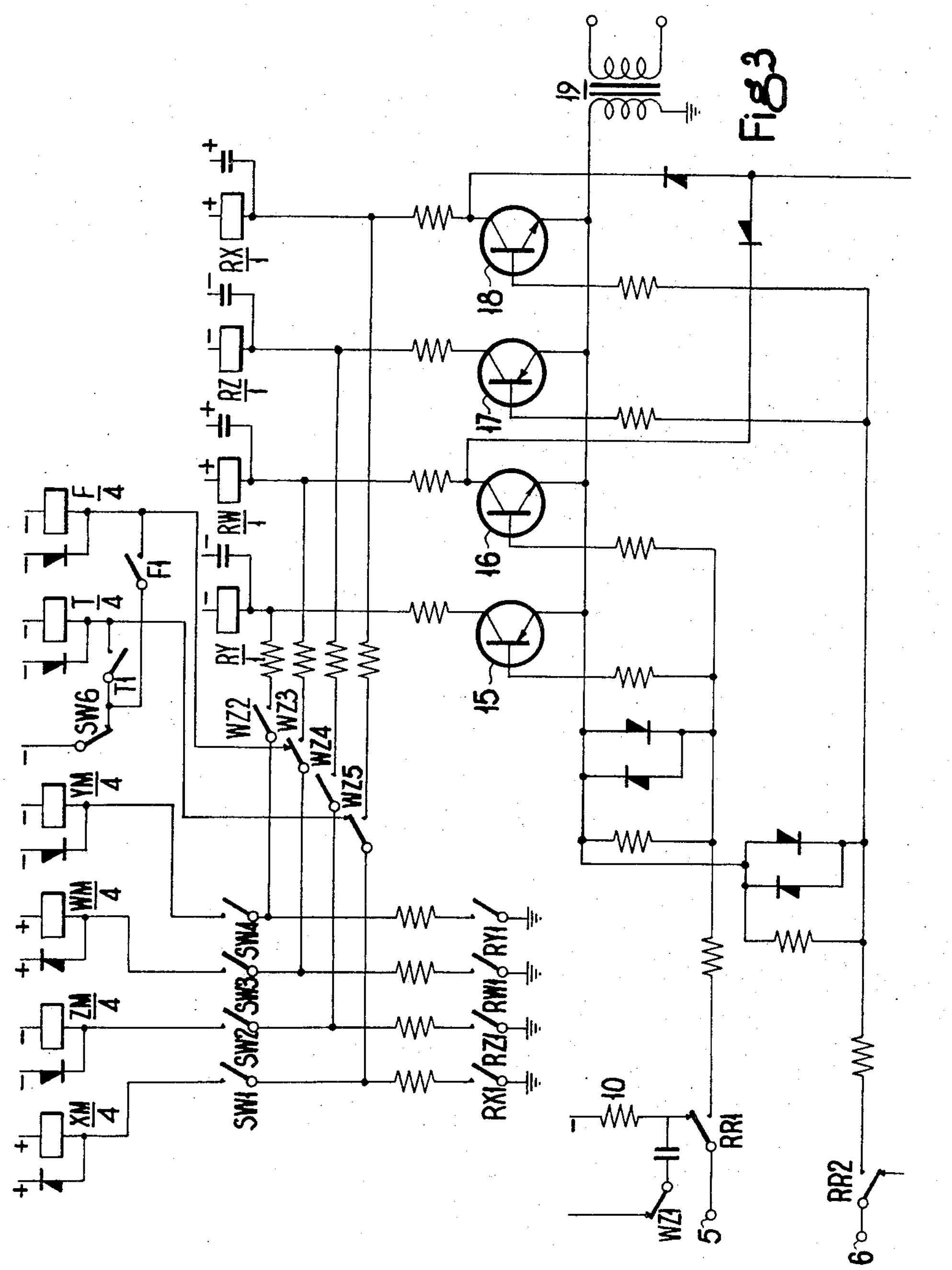
Figures 4, 5:
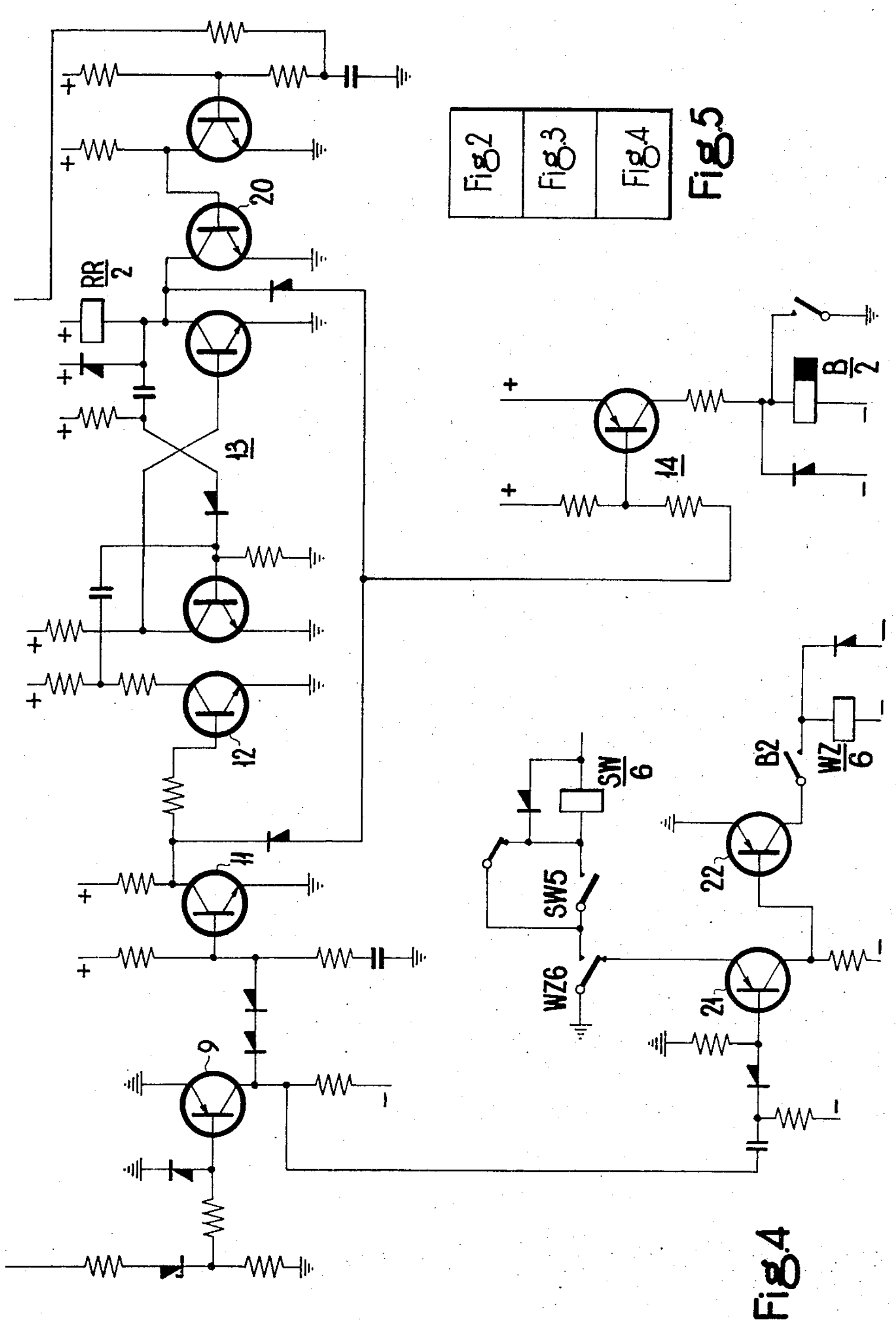
Figure 6:
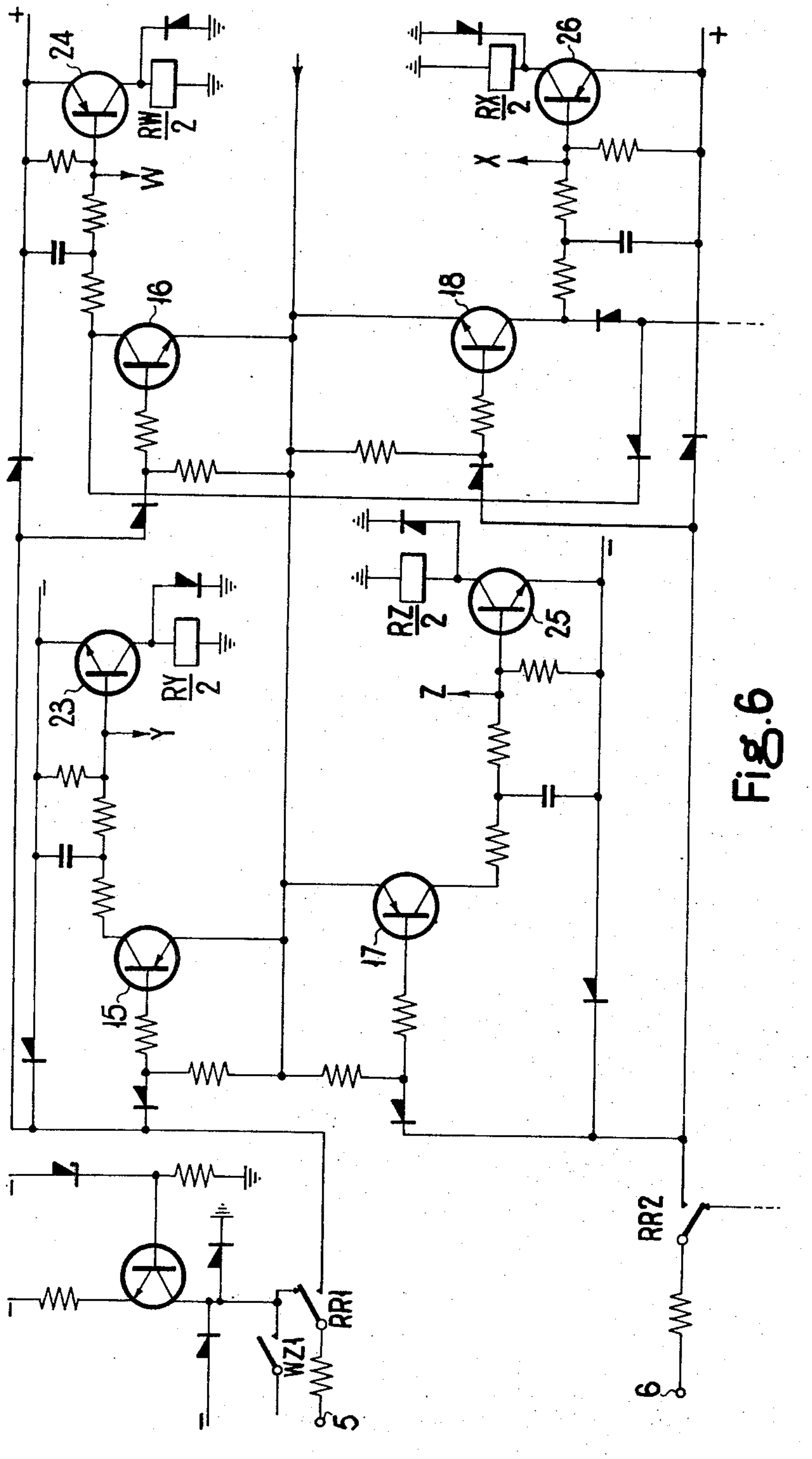

A detector circuit for a private automatic telephone exchange system in accordance with the present invention, together with a modification thereof, will now be described by way of example with reference to the accompanying drawings, of which:

FIG. 1 shows part of the exchange system schematically,

FIGS. 2, 3 and 4, when arranged as shown in FIG. 5 show the detector circuit diagrammatically, and FIGS. 6 and 7 show a modification of the detector circuit shown in FIGS. 2 to 4.

Referring to the drawings, the system of which the detector circuit forms part uses pushbutton controlled "leg signalling" to connect any one of 25 subscribers sets 1 to another or to a tie line. Each subscriber's line is allotted a two-digit number, and to set up a call a subscriber operates in turn the required button or buttons out of 10 pushbuttons 2 provided to signal the two digits, operation of any one of the 10 pushbuttons applying to the respective pair of line wires 3, at the calling instrument, a characteristic combination of terminations. Thus when a button is pressed each line wire of the pair 3 may be open circuited, connected directly to earth, connected to earth by way of a rectifier element poled in one sense or connected to earth by way of a rectifier poled in the opposite sense, according to the digit value of the respective pushbutton.

When a subscriber lifts his handset to initiate a call the line wires 3 of the subscriber's extension set 1 are connected by way of a linefinder circuit 4 to the input terminals 5 and 6 of FIG. 3, and once the signals indicating the number to be called have been received and detected the subscriber's line is connected to the appropriate extension by way of a circuit including a final selector 7 of which one bank of contacts 8 is shown in FIG. 2.

When the calling line is connected by the line-finder 4 to the terminals 5 and 6 the transistor 9, which is normally non-conducting, is caused to conduct by means of bias current flowing through a resistor 10, contacts RR1, the looped subscribers circuit and contacts RR2 to the base circuit of the transistor 9. At this time dial tone is applied to the line by way of the contacts WZ1 and RR1. When the calling subscriber operates a pushbutton to signal the first digit of the called number the bias loop for the transistor 9 is interrupted, and the transistor 9 ceases to conduct, whereupon a transistor 11 also ceases to conduct and a transistor 12 is biased into conduction. The consequent negative-going potential in the collector circuit of the transistor 12 is arranged to set a monostable circuit 13 to its unstable state, operating a relay RR and providing a forward bias otherwise obtained from the collector circuit of the transistor 11 for a transistor stage 14 which maintains energized a relay B which was first energized in response to the transistors 9 and 11 being biased into conduction.

Upon operation of the relay RR its contacts RR1 and RR2 connect the subscriber's line conductors 3 to the base electrodes of respective pairs of transistors 15 and 16 and 17 and 18, the transistors 15 and 17 being p-n-p transistors and the transistors 16 and 18 being n-p-n. A 50 Hertz sine save of approximately 6 volts amplitude is applied from a transformer 19 between earth and the emitter electrodes of all the transistors 15 and 19, and in response to any consequent current flow to the terminations then applied to the line at the subscriber's set one or more of the transistors 15 and 18 is biased into conduction during alternate half-cycles of the sine wave so that one or more of respective relays RY, RW, RZ and RX are energized.

In the particular detector being described the first digit signalled has a value 2, 3 or 4 only, for which values one or both of the relays RW and RX are energized, and in response to receipt of a first digit of one of these values one or both of the relays T and F are energized by way of respective contacts RX1 and WZ5 and RW1 and WZ3.

In response to the operation of relay T alone its contacts T2 and T4 apply earth potential, obtained by way of contacts B1, to all contacts of the bank 8 except the third contact, which is disconnected by contacts T3. The final selector 7 then steps all its wipers to the third contacts and stops. In a similar way if the relay F alone is operated the final selector 7 is arranged to step its wipers to their thirteenth contacts, while if both relays T and F are operated the final selector 7 is arranged to step its wipers to their eighteenth contacts.

When the first selected pushbutton is released those of the relays RY, RW, RZ and RX that are operated release, but the relays T and F, if operated, are held energized by way of their respective contacts T1 and F1. While this first pushbutton is depressed the monostable circuit 13 returns to its stable state, but an alternative energizing path for the relay RR is provided by way of a transistor 20, which is biased into conduction when either or both of transistors 16 and 18 is or are conducting. When the first pushbutton is released this alternative path by way of transistor 20 ceases to conduct and the relay RR releases. At the same time the transistor 9 is again biased into conduction, and the resultant positive going change of potential at its collector electrode temporarily removes the forward bias of a transistor 21 which in switching off permits energization of a relay WZ by way of a transistor 22 and contacts B2. The resulting changeover of contacts WZ6 completes an energizing path for another relay SW.

Contacts of the relays WZ and SW prepare hold paths for the relays RY, RW, RZ and RX and prepare energizing paths for respective marker relays YM, WM, ZM and XM. In addition contacts WZ1 remove the dial tone from the subscriber's line, while contacts SW6 break the hold circuits for the relays T and F.

When the pushbutton corresponding to the second digit to be signalled is depressed the relay RR again operates, the alternating voltage is applied to the terminations from the transformer 19, and a combination of the relays RY, RW, RZ and RX corresponding to the digit value are energized by way of the respective transistors 15 to 18. The corresponding combination of the relays YM, WM, ZM and XM are operated, whereupon earth potential is applied as required to contacts of the bank 8 of the final selector 7 to drive its wipers to the contacts of the called subscriber from the position to which they were driven upon operation of the first pushbutton.

The terminations chosen to represent the 10 possible digit values are such that at least one of the relays RX or RW is always operated when a button is depressed, so that when the second digit is being signalled either or both of the relays XM or WM are operated. In consequence a relay C (FIG. 2) is operated, and contacts of this relay initiate the testing of the called line for busy condition, generation of the ringing signal and the final connections between the two subscribers.

More than one link circuit each including a detector circuit as described above may be provided in dependence upon the volume of traffic to be handled by the private exchange.

Referring now to FIGS. 6 and 7 in a modified form of receiver and decoder circuit which is arranged to provide trains of impulses for operating a final selector or signalling to another exchange, each of the transistors 15 to 18 is followed by a respective single stage buffer amplifier which energizes the respective relay RY, RW, RZ or RX, the transistors 23 to 26 of these buffer stages being of opposite conductivity type to the respective transistors 15 to 18.

The part of the modified circuit corresponding to FIG. 4 responds in the manner described above to looping of a subscriber's line and the operation of a first pushbutton, but in the modified circuit the release of the first-operated pushbutton results directly in the operation of the relay WZ, the relay SW operating subsequently, as will be described.

When the first pushbutton is operated, the appropriate ones of the relays RW, RX, RY and RZ are operated and output signals are applied by the respective first contacts of these relays and contacts WZ2 to WZ4 to a logic network 27 which decodes these output signals and enters into a counter 28 a count corresponding to the digit value of the first operated pushbutton. This digit value is then counted out by dialling-type impulses from a generator 29, these impulses being simultaneously passed to the final selector or to another exchange to signal the digit value.

When the first-operated pushbutton is released the relay WZ operates, and its contacts WZ2 to WZ4 prepare holding paths for the relays RW to RZ by way of their respective first contacts and the paths W to Z which are connected to the respective base electrodes of the transistors 23 to 26. Thus when the second pushbutton is operated those of the relays RW to RZ that are energized thereby are held operated in dependence upon the condition of the relay WZ.

When the first digit value has been counted out of the counter 28 a gate 30 applies a signal to a delay circuit 31 which, after a delay appropriate for an interdigit pause completes an operating circuit for the relay SW, whereupon the signals representing the digit value of the second push button are entered in the counter 28 for impulsing out in like manner to those of the first pushbutton.

The logic network 27, the counter 28 and the gate 30 may utilize integrated circuits. The impulse generator 29 may be enabled by an output from the gate 30 to operate only when the count registered by the counter 28 is non-zero.

I claim:

1. In a private automatic telephone exchange system in which subscriber-operated pushbuttons are used to apply combinations of a plurality of different terminations to the two line wires of the respective subscriber's line in order to signal to the exchange the digits of a number to be called: the combination in the exchange of A. a detector circuit comprising
  i. two groups of transistors,
  ii. means to apply an alternating voltage to each of a respective subscriber's line wires by way of an input circuit of each transistor of a respective one of said groups,
  iii. whereby different current flow conditions are developed in said input circuits in response to the application of different terminations to a respective subscriber's line wires, and different ones or combinations of the transistors of a group are caused to conduct in response to the application of said different terminations, and B. means responsive to current flow through said transistors to register the value of a digit being signalled.

2. A system in accordance with claim 1 wherein there are four different terminations for each line comprising respectively open circuit, a direct connection to earth and connections to earth by way of respective rectifier elements posed in opposite senses, and each group of transistors comprises two transistors of opposite conductivity type.

3. A system in accordance with claim 2 wherein the alternating voltage is applied in common to the emitter electrodes of all four transistors while the base electrodes of the two transistors in each group are connected to the respective line wire.

4. A system in accordance with claim 2 wherein each of the four transistors is arranged when conducting to energize a respective relay.

5. A system in accordance with claim 2 wherein each of the four transistors is arranged when conducting to energize a respective relay by way of a respective transistor buffer stage.

6. A system in accordance with claim 4 wherein there are provided marking means operable in response to the energization of different combinations of said relays to apply marking potentials to different contacts of a final selector.

7. A system in accordance with claim 6 wherein the marking means comprises a plurality of further relays.

8. A system in accordance with claim 1, wherein said means responsive to current flow through said transistors comprises logic means to enter into storage means signals representing the digit value of an operated pushbutton and there are provided means to generate a train of signalling impulses in dependence upon the signals entered in said storage means.

9. A system in accordance with claim 8 wherein said storage means comprises a binary counter.

* * * * *